(12) United States Patent
Komatsu

(10) Patent No.: US 10,055,181 B2
(45) Date of Patent: Aug. 21, 2018

(54) IMAGE PROCESSING DEVICE, INFORMATION PROCESSING DEVICE, IMAGE PROCESSING METHOD, AND NON-TRANSITORY COMPUTER READABLE MEDIUM

(71) Applicant: FUJI XEROX CO., LTD., Tokyo (JP)

(72) Inventor: Takashi Komatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/208,321

(22) Filed: Jul. 12, 2016

(65) Prior Publication Data
US 2017/0269884 A1    Sep. 21, 2017

(30) Foreign Application Priority Data
Mar. 17, 2016   (JP) ................................. 2016-054178

(51) Int. Cl.
*G06F 15/00*   (2006.01)
*G06F 3/12*    (2006.01)

(52) U.S. Cl.
CPC .......... *G06F 3/1236* (2013.01); *G06F 3/1222* (2013.01); *G06F 3/1292* (2013.01)

(58) Field of Classification Search
CPC ..... G06F 3/1236; G06F 3/1292; G06F 3/1222
USPC .............................................. 358/1.13–1.15
See application file for complete search history.

(56) References Cited

U.S. PATENT DOCUMENTS

| 2009/0147306 A1* | 6/2009 | Sugiyama ............. G06F 3/1222 |
| | | 358/1.15 |
| 2012/0268769 A1* | 10/2012 | Kashioka ............. G06F 3/1204 |
| | | 358/1.14 |
| 2013/0188221 A1 | 7/2013 | Ohno |

FOREIGN PATENT DOCUMENTS

| JP | 2007148803 A | 6/2007 |
| JP | 2011216089 A | 10/2011 |
| JP | 2013149103 A | 8/2013 |

* cited by examiner

*Primary Examiner* — Saeid Ebrahimi Dehkord
(74) *Attorney, Agent, or Firm* — Oliff PLC

(57) ABSTRACT

An image processing device includes a receiving unit, a determining unit, a transmitting unit, and a presenting unit. The receiving unit receives an application for use of the image processing device from an applicant. The determining unit determines whether or not the applicant is associated with an administrator of the image processing device. The transmitting unit transmits, in a case where the applicant is associated with the administrator of the image processing device, a registration request to an external device so that the applicant is permitted to use the image processing device. The presenting unit presents, after a notification indicating registration is received from the external device, information indicating the permission for use to the applicant.

7 Claims, 17 Drawing Sheets

FIG. 4

| PRINTER ADMINISTRATOR ID (410) | CLOUD (420) |
|---|---|
|  |  |

| PRINTER ID (510) | USER ID (520) |
|---|---|
|  |  |

| USER ID (610) | USER NAME (620) | USER ADDRESS (630) |
|---|---|---|
|  |  |  |

600

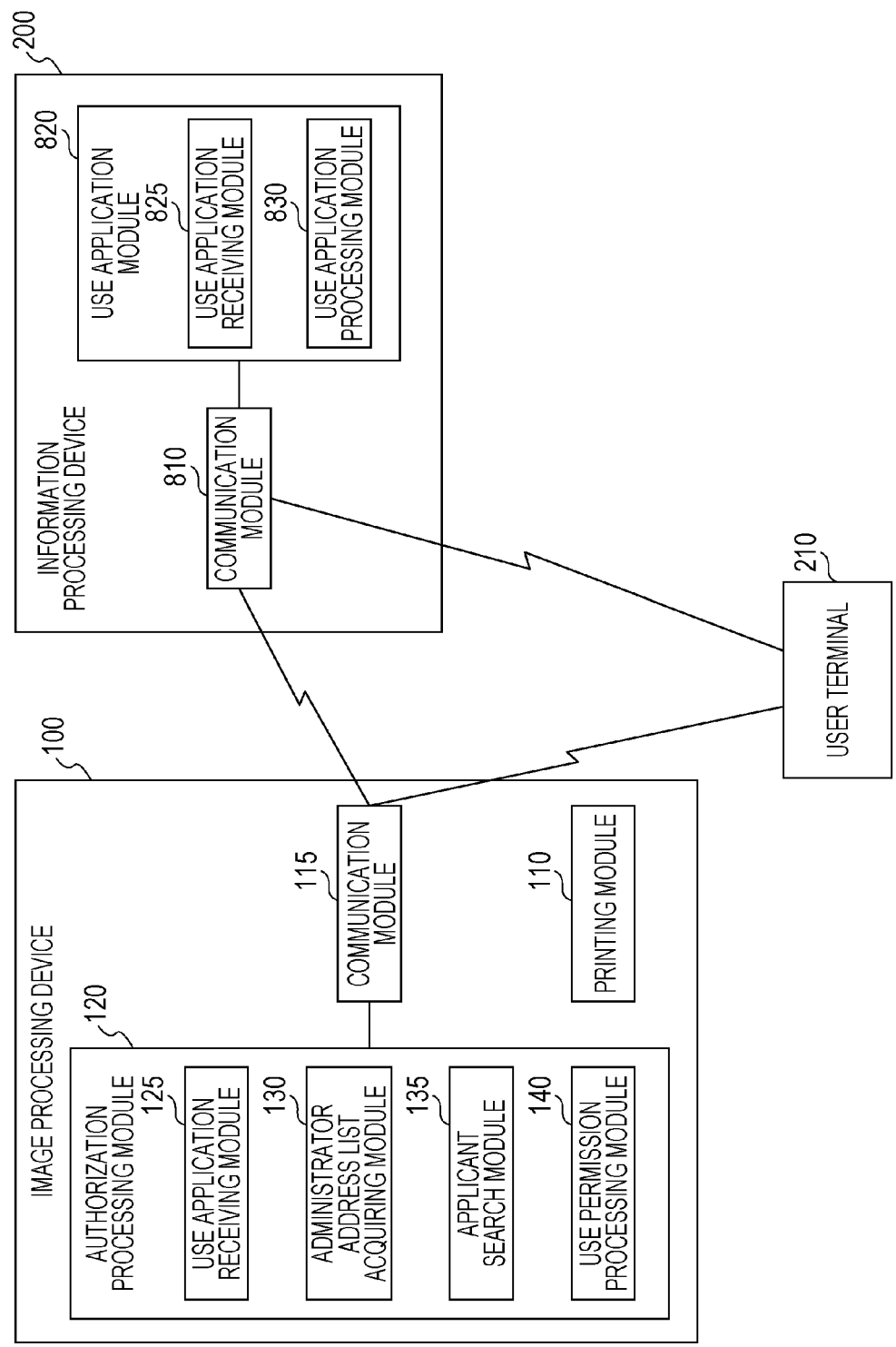

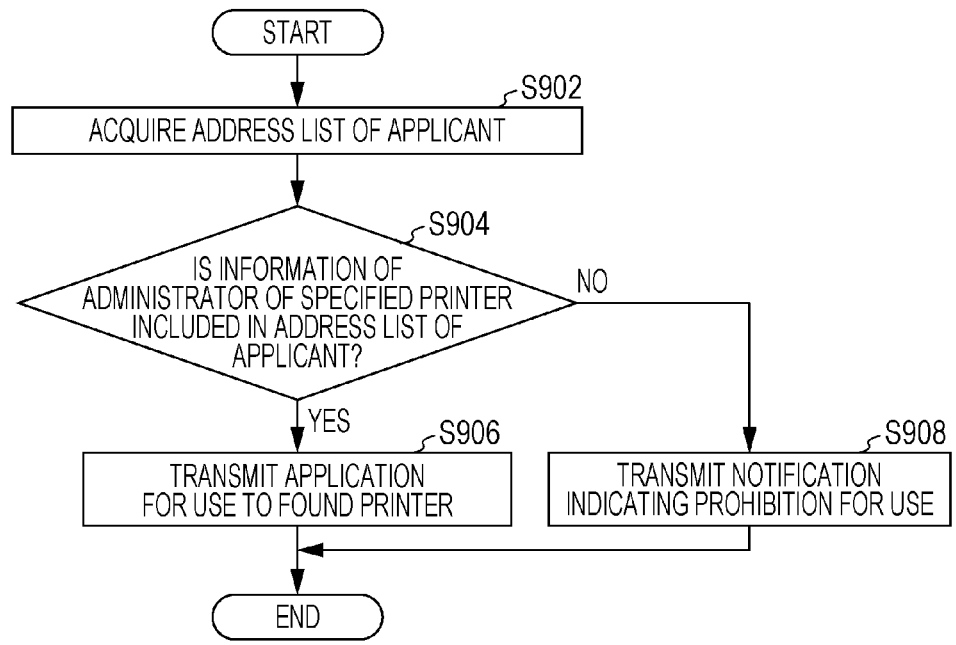

| DOCUMENT ID | USER ID | AUTHORIZATION |
|---|---|---|
| | | |

1700, 1710, 1720, 1730

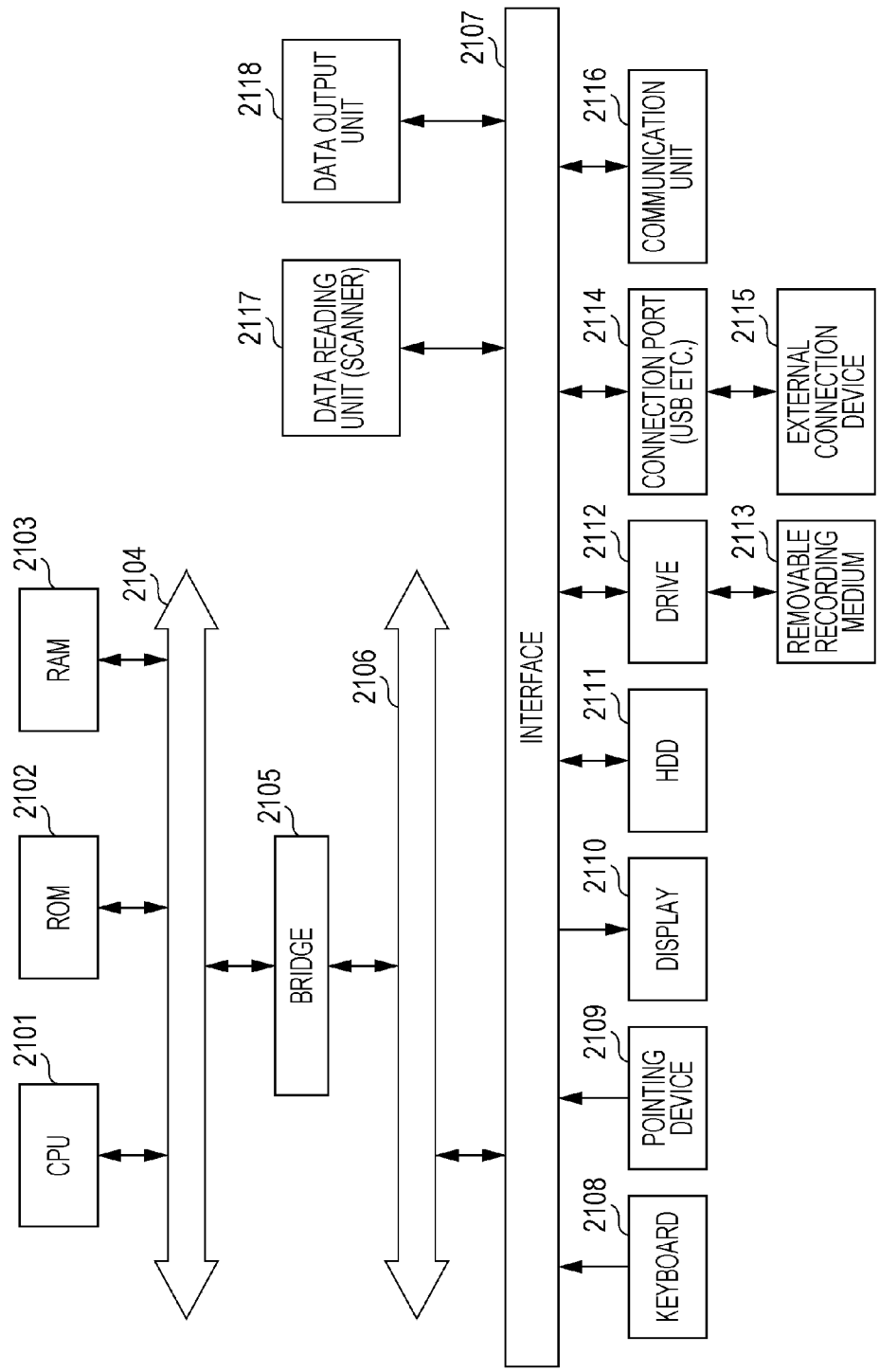

IMAGE PROCESSING DEVICE, INFORMATION PROCESSING DEVICE, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-054178 filed Mar. 17, 2016.

BACKGROUND

Technical Field

The present invention relates to an image processing device, an information processing device, an image processing method, and a non-transitory computer readable medium.

SUMMARY

According to an aspect of the invention, there is provided an image processing device including a receiving unit, a determining unit, a transmitting unit, and a presenting unit. The receiving unit receives an application for use of the image processing device from an applicant. The determining unit determines whether or not the applicant is associated with an administrator of the image processing device. The transmitting unit transmits, in a case where the applicant is associated with the administrator of the image processing device, a registration request to an external device so that the applicant is permitted to use the image processing device. The presenting unit presents, after a notification indicating registration is received from the external device, information indicating the permission for use to the applicant.

BRIEF DESCRIPTION OF THE DRAWINGS

Exemplary embodiments of the present invention will be described in detail based on the following figures, wherein:

FIG. 4 is an explanatory diagram illustrating an example of a data structure of a printer administrator information table;

FIG. 5 is an explanatory diagram illustrating an example of a data structure of a printer use permission table;

FIG. 6 is an explanatory diagram illustrating an example of a data structure of an address table;

FIG. 8 is a conceptual module configuration diagram illustrating an example of a configuration according to a second exemplary embodiment;

FIG. 9 is a flowchart illustrating an example of a process according to the second exemplary embodiment;

FIG. 10 is an explanatory diagram illustrating an example of a data structure of a printer administrator information table;

FIG. 21 is a block diagram illustrating an example of a hardware configuration of a computer implementing an exemplary embodiment.

DETAILED DESCRIPTION

Hereinafter, exemplary embodiments of the present invention will be described with reference to the drawings.

First Exemplary Embodiment

Figure 1:
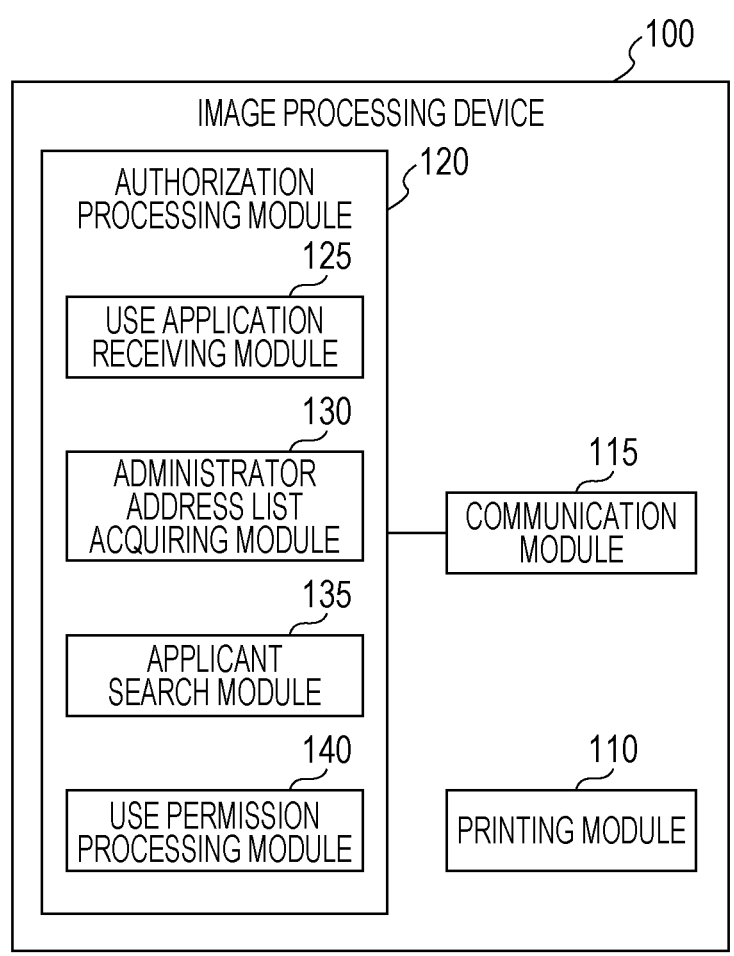
FIG. 1 is a conceptual module configuration diagram illustrating an example of a configuration according to a first exemplary embodiment.

FIG. 1 is a conceptual module configuration diagram illustrating an example of a configuration according to a first exemplary embodiment.

In general, the term "module" refers to a component such as software (a computer program), hardware, or the like, which may be logically separated. Therefore, a module in an exemplary embodiment refers not only to a module in a computer program but also to a module in a hardware configuration. Accordingly, through an exemplary embodiment, a computer program for causing the component to function as a module (a program for causing a computer to perform each step, a program for causing a computer to function as each unit, and a program for causing a computer to perform each function), a system, and a method are described. However, for convenience of description, the terms "store", "cause something to store", and other equivalent expressions will be used. When an exemplary embodiment relates to a computer program, the terms and expressions represent "causing a storage unit to store", or "controlling a storage unit to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, hereinafter, the term "connection" may refer to logical connection (such as data transfer, instruction, and cross-reference relationship between data) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required.

Moreover, a "system" or a "device" may be implemented not only by multiple computers, hardware, devices, or the like connected through a communication unit such as a network (including a one-to-one communication connection), but also by a single computer, hardware, device, or the like. The terms "device" and "system" are used as synonymous terms. Obviously, the term "system" does not include social "mechanisms" (social system), which are only artificially arranged.

Furthermore, for each process in a module or for individual processes in a module performing plural processes, target information is read from a storage unit and a processing result is written to the storage unit after the process is performed. Therefore, the description of reading from the storage unit before the process is performed or the description of writing to the storage unit after the process is performed may be omitted. The storage unit may be a hard disk, a random access memory (RAM), an external storage medium, a storage unit using a communication line, a register within a central processing unit (CPU), or the like.

An image processing device 100 according to the first exemplary embodiment is a device which prints documents (includes a so-called printer function), and includes, as in the example illustrated in FIG. 1, a printing module 110, a communication module 115, and an authorization processing module 120.

There is a function called cloud printing. The cloud printing represents printing using a cloud service. Cloud printing is performed in the order of:

(1) a document is stored into a cloud;
(2) a device is registered to the cloud;
(3) a permission to use the image processing device (may also be called a printer or a device) is associated with a user; and
(4) a printing request for printing the stored document with the registered image processing device is issued.

Hereinafter, a device which includes a cloud function and a cloud printing function will also be referred to as an information processing device.

In cloud printing, an instruction to perform printing is issued to an image processing device which is registered to the cloud. Therefore, a person who is able to use the image processing device is registered in advance to the cloud. In a case where an exemplary embodiment of the present invention is not employed, in order to perform the above registration processing, an administrator of the image processing device performs a registration process.

The image processing device is a device which includes at least a printer function, and may be, for example, a printer, a copying machine, a facsimile machine, or a multifunction device (an image processing device which includes at least two or more of functions of a scanner, a printer, a copying machine, a facsimile machine, and the like).

The printing module 110 prints a document which is received by the communication module 115.

The communication module 115 is connected to the authorization processing module 120. The communication module 115 performs communication with a terminal which is used by an applicant or the like (a user terminal 210, which will be described later with reference to FIG. 2, or the like), an information processing device which includes a cloud printing function (an information processing device 200, which will be described later with reference to FIG. 2, or the like), and the like.

The authorization processing module 120 includes a use application receiving module 125, an administrator address list acquiring module 130, an applicant search module 135, and a use permission processing module 140, and is connected to the communication module 115. The authorization processing module 120 grants an applicant a permission to perform cloud printing using the image processing device 100.

The use application receiving module 125 receives, from a terminal which is used by an applicant via the communication module 115, an application for acquisition of a permission for cloud printing using the image processing device 100.

The administrator address list acquiring module 130 extracts an administrator of the image processing device 100, and acquires, for example, an address list of the administrator. Information of an administrator is stored in the image processing device 100. For example, information of an administrator may be extracted from a printer administrator information table 400 which is stored in the image processing device 100. FIG. 4 is an explanatory diagram illustrating an example of a data structure of the printer administrator information table 400. The printer administrator information table 400 includes a printer administrator ID field 410 and a cloud field 420. In the first exemplary embodiment, the printer administrator ID field 410 stores information (a printer administrator identification (ID)) for uniquely identifying a printer administrator. A user name of the printer administrator or the like may be stored in the printer administrator ID field 410. In the cloud field 420, information of a cloud corresponding to the printer administrator is stored. In this example, a printer administrator is set for each cloud. However, the cloud field 420 may not be provided. In such a case, the printer administrator information table 400 includes only the printer administrator ID field 410. Furthermore, as the cloud field 420, a combination of a login ID and a password or information regarding OAuth or the like may be stored, so that logging into a cloud may be performed. That is, for some clouds, logging into a cloud may be performed by a printer administrator so that permission may be granted to an applicant. In such a case, after login is performed by using information stored in the cloud field 420, information indicating that a permission for use is granted to the applicant is transmitted to the cloud. Furthermore, information stored in the cloud field 420 may be used to extract an address table 600 or the like from a user information storage device 220. For example, information stored in the cloud field 420 may be used for a case where logging into a social networking service (SNS) is performed and a friend list is acquired.

The applicant search module 135 searches a storing device (the user information storage device 220, which will be described later with reference to FIG. 2, the user terminal 210 which is used by an administrator, or the like) which stores information of a person who is associated with an administrator of the image processing device 100 (for example, a person who is able to communicate with an administrator of the image processing device 100; hereinafter, explanation will be provided by way of example of such a person) for information of an applicant who applies for use of the image processing device 100. In the case where information of the applicant is stored in the storing device (in the case where an applicant is found), there is a high possibility that the administrator and the applicant are able to communicate with each other and they know each other. Therefore, a permission to use the image processing device 100 may be granted to the applicant. The storing device which stores information of a person who is able to communicate with an administrator may be, for example, an electronic mail address book, a friend list in an SNS, an electronic address book (user information) of the administrator, or the like. Furthermore, a determination as to whether or not a domain range, an email domain, or the like of a user ID (including a user address or the like) is the same between the administrator and the applicant may also be performed. For example, in the user information storage device 220 or the user terminal 210 which is used by the administrator, the address table 600 (of the administrator) is stored for each user. FIG. 6 is an explanatory diagram illustrating an example of a data structure of the address table 600. The address table 600 includes a user ID field 610, a user name field 620, and a user address field 630. A user ID is stored in the user ID field 610. The name of the user of the user ID is stored in the user name field 620. The user address of the user is stored in the user address field 630.

In the case where information of an applicant who applies for use of the image processing device 100 is stored in the storing device which stores information of a person who is able to communicate with the administrator of the image processing device 100 (based on a result of processing by the applicant search module 135), the use permission processing module 140 transmits to the information processing device information indicating that a permission for use is granted to the applicant. Obviously, in the case where information of the applicant is not stored in the storing device, the use permission processing module 140 performs error processing (presentation of an error message to the applicant, etc.) or the like, without transmitting to the information processing device information indicating that a permission for use is granted to the applicant.

The information processing device associates the image processing device 100 with the applicant. For example, the information processing device performs management using a printer use permission table 500. FIG. 5 is an explanatory diagram illustrating an example of a data structure of the printer use permission table 500. The printer use permission table 500 includes a printer ID field 510 and a user ID field 520. In the first exemplary embodiment, information (in this example, a printer ID) for uniquely identifying an image processing device is stored in the printer ID field 510. In the first exemplary embodiment, information (a user ID) for uniquely identifying a user (permitted applicant) is stored in the user ID field 520.

After an information regarding registration is received from the information processing device, the use permission processing module 140 presents a permission for use to the applicant. The presentation may be transmission of an electronic mail or the like.

Furthermore, in the case where an applicant is deleted as a person who is able to communicate with an administrator from the storing device, the use permission processing module 140 may transmit to the information processing device information indicating cancellation of the permission for use which was granted to the applicant. That is, in the case where after a permission for use is granted to an applicant, information stored in the storing device is changed and the applicant is deleted, the permission for use which was granted to the applicant is also deleted. The above processing may be performed at predetermined intervals or may be performed when a notification indicating occurrence of a change is received from the storing device.

Figure 2:
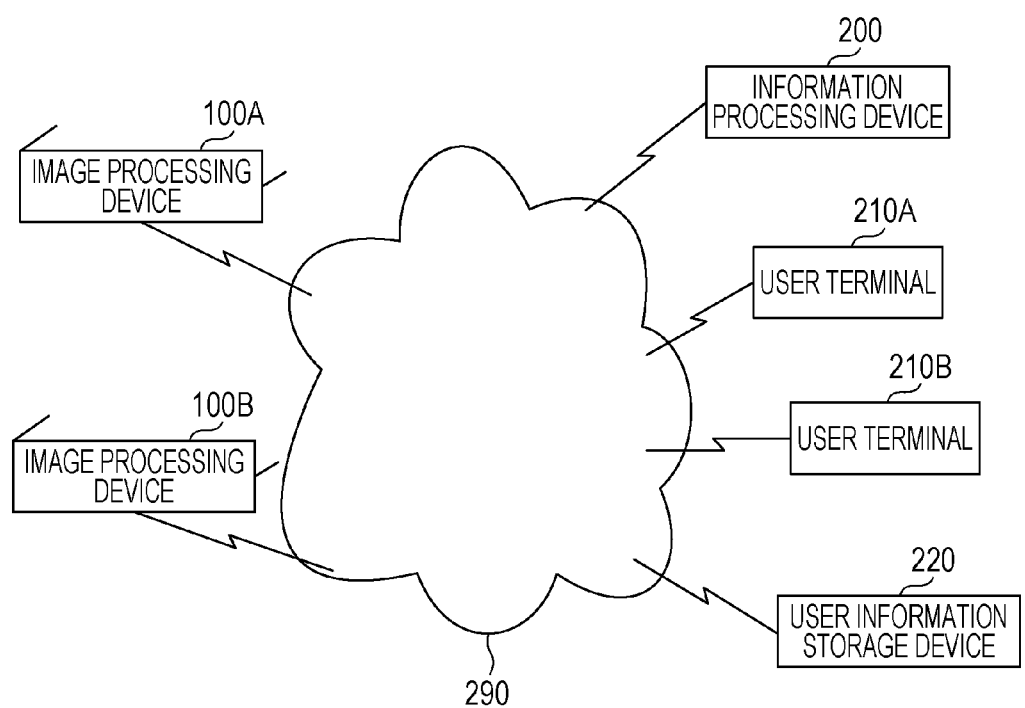
FIG. 2 is an explanatory diagram illustrating an example of a system configuration which uses an exemplary embodiment.

FIG. 2 is an explanatory diagram illustrating an example of a system configuration which uses an first exemplary embodiment.

An image processing device 100A, an image processing device 100B, an information processing device 200, a user terminal 210A, a user terminal 210B, and the user information storage device 220 are connected to one another via a communication line 290. The communication line 290 may be implemented in a wireless manner, a wired manner, or a combination of wired and wireless connections. For example, the communication line 290 may be the Internet, intranet, or the like as a communication infrastructure. Furthermore, functions of the information processing device 200 and the user information storage device 220 may be implemented as a cloud service (cloud printing). The user terminal 210 transmits an application for use to the image processing device 100. The user terminal 210 may be, for example, a personal computer (PC) (including a notebook PC, a tablet PC, and the like), a portable terminal device (including a smartphone, a mobile phone, and the like), or the like. The user information storage device 220 stores, for example, an address book, a friend list, an electronic address book, and the like of each user, as described above.

Figure 3:
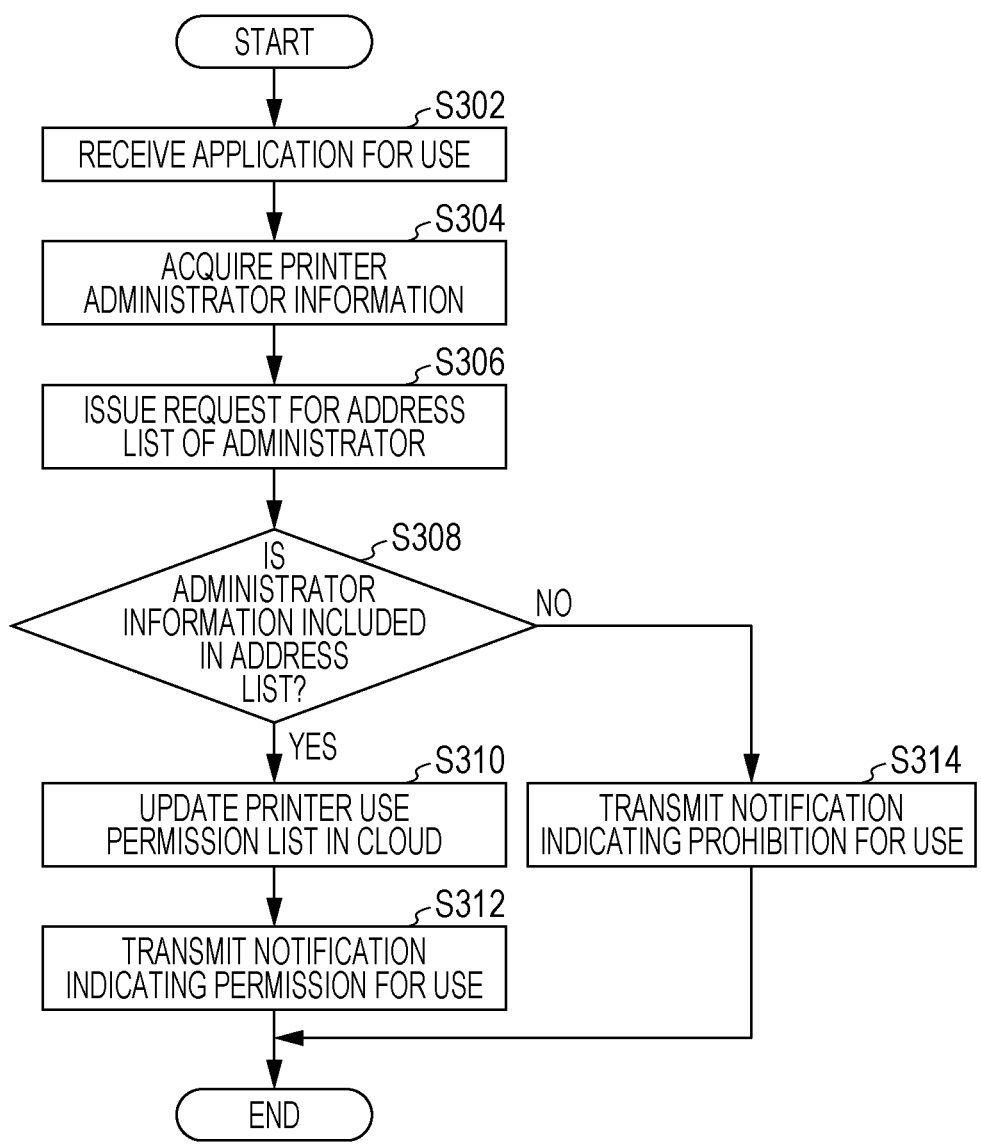
FIG. 3 is a flowchart illustrating an example of a process according to the first exemplary embodiment.

FIG. 3 is a flowchart illustrating an example of a process according to the first exemplary embodiment.

In step S302, the use application receiving module 125 receives an application for use of the image processing device 100 from the user terminal 210 of an applicant.

In step S304, the administrator address list acquiring module 130 acquires printer administrator information. As described above, for example, the printer administrator information may be obtained from the printer administrator information table 400.

In step S306, the administrator address list acquiring module 130 issues a request for an address list of an administrator. As described above, for example, the address list of the administrator is obtained from the address table 600 of the administrator stored in the user information storage device 220.

In step S308, the applicant search module 135 determines whether or not applicant information is included in the address list. In the case where the applicant information is included in the address list, the process proceeds to step S310. In the case where the applicant information is not included in the address list, the process proceeds to step S314.

In step S310, the use permission processing module 140 updates a printer use permission list in a cloud (the information processing device 200).

In step S312, the use permission processing module 140 transmits a notification indicating a permission for use to the user terminal 210 of the applicant.

In step S314, the use permission processing module 140 transmits a notification indicating a prohibition for use to the user terminal 210 of the applicant.

Figure 7:
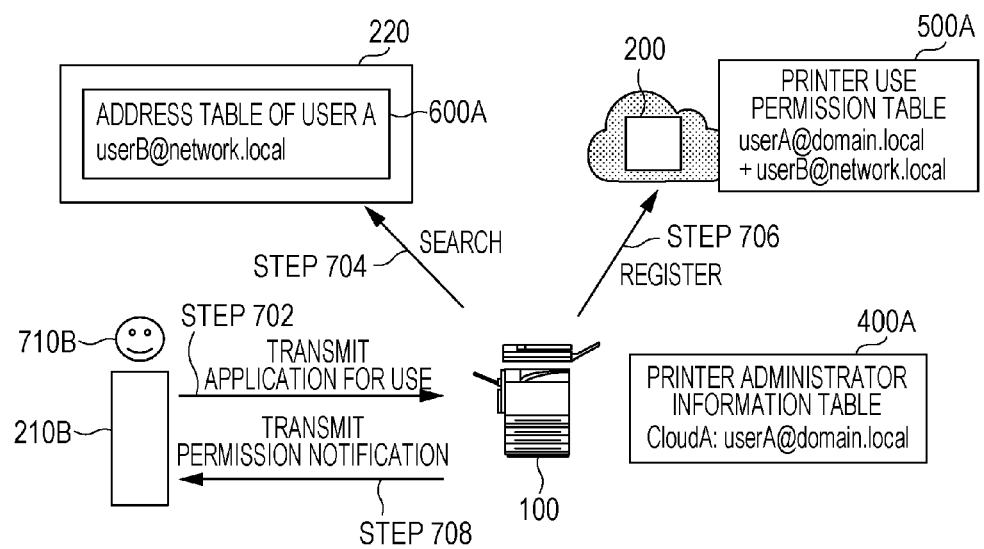
FIG. 7 illustrates an example of a process according to the first exemplary embodiment.

FIG. 7 illustrates an example of a process according to the first exemplary embodiment.

The image processing device 100 stores a printer administrator information table 400A. In the printer administrator information table 400A, "CloudA: userA@domain.local" is registered. That is, the administrator of the image processing device 100 is a user A and is registered as an administrator in a CloudA (cloud printing).

The user information storage device 220 stores an address table 600A of the user A. In the address table 600A of the user A, "userB@network.local" is registered.

Furthermore, the information processing device 200 stores a printer use permission table 500A. At this stage, only "userA@domain.local" is registered.

In STEP 702, in accordance with an operation by a user B 710B (user ID: user B), the user terminal 210B applies for use of the image processing device 100.

In STEP 704, the image processing device 100 searches the address table 600A of the user A stored in the user information storage device 220 for information of the user B. In this case, information of the user B exists in the address table 600A of the user A. Therefore, the user B 710B is granted the permission for use.

In STEP 706, the image processing device 100 registers the permission for use granted to the user B 710B to the information processing device 200. After this processing, in the printer use permission table 500A of the information processing device 200, "userA@domain.local" and "userB@network.local" are registered.

In STEP 708, the image processing device 100 transmits a permission notification to the user terminal 210B (user B 710B).

Second Exemplary Embodiment

FIG. 8 is a conceptual module configuration diagram illustrating an example of a configuration according to a second exemplary embodiment.

Parts similar to those in the foregoing embodiment will be referred to with the same reference signs, and explanation for those similar parts will be omitted (the same applies to the below).

The image processing device 100 includes the printing module 110, the communication module 115, and the authorization processing module 120. The communication module 115 is connected to the authorization processing module 120, and is connected to a communication module 810 of the information processing device 200 and the user terminal 210 via a communication line. The authorization processing module 120 includes the use application receiving module 125, the administrator address list acquiring module 130, the applicant search module 135, and the use permission processing module 140, and is connected to the communication module 115.

The information processing device 200 includes the communication module 810 and a use application module 820.

The communication module 810 is connected to the use application module 820, and is connected to the communication module 115 of the image processing device 100 and the user terminal 210 via a communication line. The communication module 810 performs communication with the image processing device 100, the user terminal 210, and the like.

The use application module 820 includes a use application receiving module 825 and a use application processing module 830, and is connected to the communication module 810. The use application module 820 performs processing regarding an application for use which is received from the user terminal 210.

The use application receiving module 825 receives an application for use of the image processing device 100 from the user terminal 210 via the communication module 810.

In the case where information of an administrator of the image processing device 100 is stored in a storing device (the user information storage device 220, the user terminal 210 which is used by an applicant, or the like) which stores information of a person who is able to communicate with an applicant who applies for use of the image processing device 100, the use application processing module 830 transmits an application by the applicant to the image processing device 100. The storing device is equivalent to the storing device described above in the first exemplary embodiment, and is, for example, the address table 600. Although information of a person who is able to communicate with an administrator is stored in the first exemplary embodiment, information of a person who is able to communicate with an applicant is stored in the second exemplary embodiment. Furthermore, information of the administrator of the image processing device 100 is extracted from, for example, a printer administrator information table 1000, which is stored in the information processing device 200. FIG. 10 is an explanatory diagram illustrating an example of a data structure of the printer administrator information table 1000. The printer administrator information table 1000 includes a printer field 1010 and a printer administrator ID field 1020. The printer field 1010 stores information (printer ID etc.) of a printer, which is an image processing device. The printer administrator ID field 1020 stores an administrator ID of the printer.

The use application receiving module 125 of the image processing device 100 receives an application for use from the information processing device 200. After this processing, processing similar to that in the first exemplary embodiment is performed.

The user terminal 210 is connected to the communication module 115 of the image processing device 100 and the communication module 810 of the information processing device 200 via a communication line. The user terminal 210 transmits an application for use of the image processing device 100 to the information processing device 200. Then, the user terminal 210 receives permission or prohibition to the use application from the image processing device 100 or the information processing device 200.

FIG. 9 is a flowchart illustrating an example of a process according to the second exemplary embodiment.

In step S902, the use application processing module 830 acquires an address list of an applicant. As described above, for example, the address list of the applicant is obtained from the address table 600 of the applicant stored in the user information storage device 220.

In step S904, the use application processing module 830 determines whether or not information of an administrator of a specified printer is included in the address list of the applicant. In the case where information of the administrator of the specified printer is included in the address list, the process proceeds to step S906. In the case where information of the administrator of the specified printer is not included in the address list, the process proceeds to step S908. The information of the administrator of the printer is obtained, for example, from the printer administrator information table 1000, as described above.

In step S906, the use application processing module 830 transmits an application for use to the printer (the image processing device 100) which is found in step S904.

In step S908, the use application processing module 830 transmits a notification indicating a prohibition for use to the user terminal 210.

By the processing of step S906, the process described in the flowchart illustrated in FIG. 3 is performed by the image processing device 100. Reception of the application for use in step S302 corresponds to reception of the application for use which is transmitted in step S906.

Figure 11:
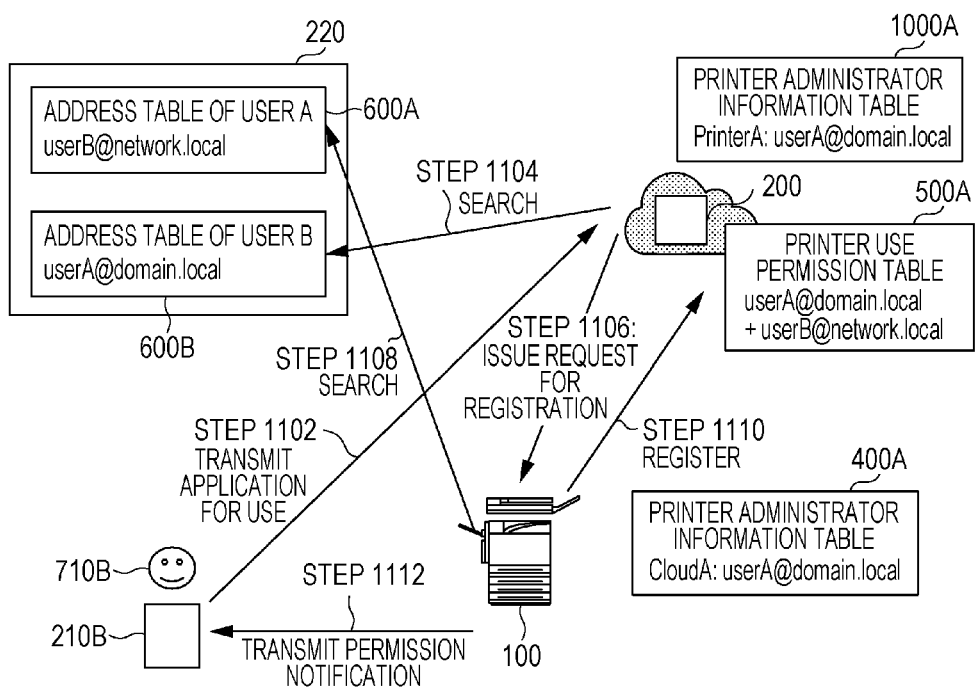
FIG. 11 illustrates an example of a process according to the second exemplary embodiment.

FIG. 11 illustrates an example of a process according to the second exemplary embodiment.

The image processing device 100 stores the printer administrator information table 400A. In the printer administrator information table 400A, "CloudA: userA@domain.local" is registered. That is, the administrator of the image processing device 100 is a user A and is registered as an administrator in the CloudA (cloud printing).

The user information storage device 220 stores the address table 600A of the user A and the address table 600B of the user B. In the address table 600A of the user A, "userB@network.local" is registered. In the address table 600B of the user B, "userA@domain.local" is registered.

Furthermore, the information processing device 200 stores the printer use permission table 500A and the printer administrator information table 1000A. At this stage, only "userA@domain.local" is registered in the printer use permission table 500A. In the printer administrator information table 1000A, "PrinterA: userA@domain.local" is registered.

In STEP 1102, in accordance with an operation by the user B 710B (user ID: user B), the user terminal 210B applies for use to the information processing device 200.

In STEP 1104, the information processing device 200 searches the address table 600B of the user B stored in the user information storage device 220 for information of the user A. Information of the user A is obtained from the printer administrator information table 1000A. In this case, information of the user A exists in the address table 600B of the user B. Therefore, the process proceeds to STEP 1106.

In STEP 1106, the information processing device 200 requests the image processing device 100 for registration of the user B 710B. After this processing, the image processing device 100 performs the processing similar to that in the first exemplary embodiment.

In STEP 1108, the image processing device 100 searches the address table 600A of the user A stored in the user information storage device 220 for information of the user B. In this case, information of the user B exists in the address table 600A of the user A. Therefore, the user B 710B is granted a permission for use.

In STEP 1110, the image processing device 100 registers the permission for use granted to the user B 710B to the information processing device 200. After this processing, "userA@domain.local" and "userB@network.local" are registered in the printer use permission table 500A of the information processing device 200.

In STEP 1112, the image processing device 100 transmits a permission notification to the user terminal 210B (the user B 710B).

Third Exemplary Embodiment

Figure 12:
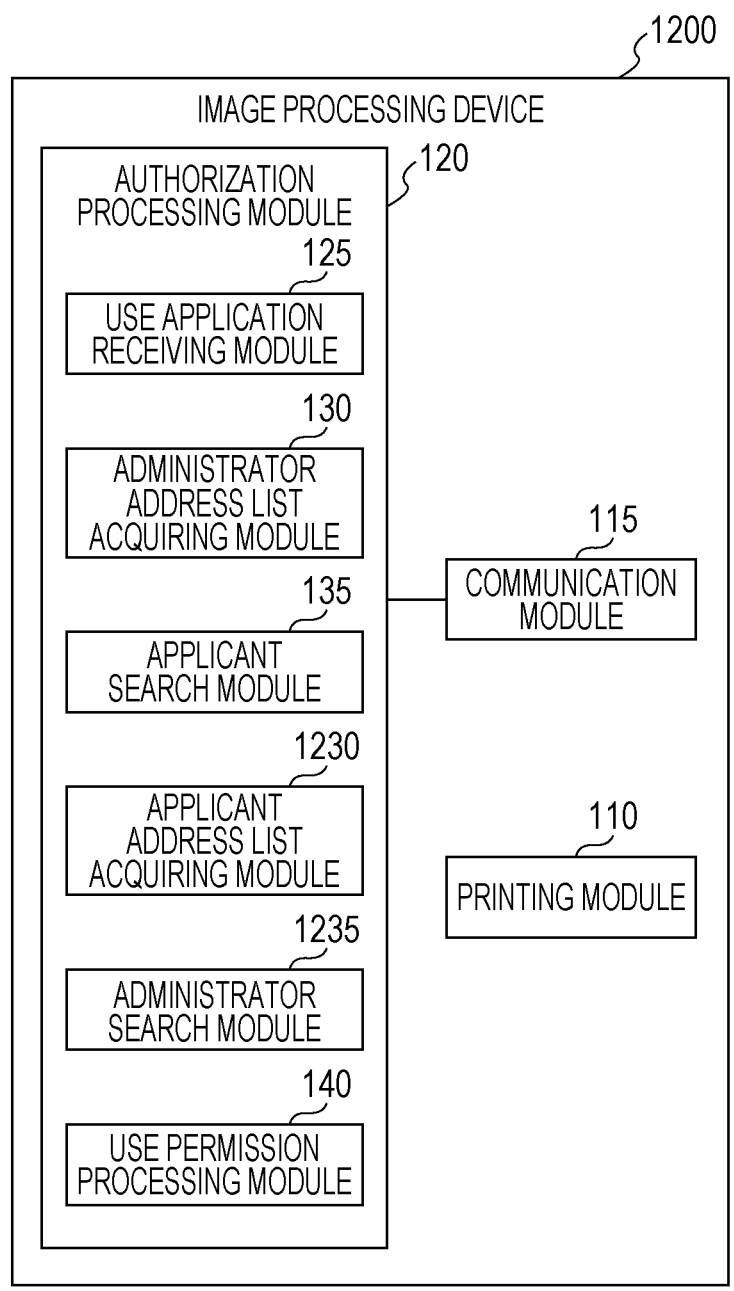
FIG. 12 is a conceptual module configuration diagram illustrating an example of a configuration according to a third exemplary embodiment.

FIG. 12 is a conceptual module configuration diagram illustrating an example of a configuration according to a third exemplary embodiment. An image processing device 1200 is configured such that an applicant address list acquiring module 1230 and an administrator search module 1235 are added to the image processing device 100 according to the first exemplary embodiment.

The image processing device 1200 includes the printing module 110, the communication module 115, and the authorization processing module 120.

The communication module 115 is connected to the authorization processing module 120.

The authorization processing module 120 includes the use application receiving module 125, the administrator address list acquiring module 130, the applicant search module 135, the applicant address list acquiring module 1230, the administrator search module 1235, and the use permission processing module 140, and is connected to the communication module 115.

The use application receiving module 125 may not only receive an application for use via the communication module 115 but also receive an application for use in accordance with an operation by an applicant using a user interface (a keyboard, a touch panel, etc.) which is provided at the image processing device 1200.

The applicant address list acquiring module 1230 acquires, for example, an address list of an applicant. Although the applicant address list acquiring module 1230 performs processing similar to that of the administrator address list acquiring module 130, the applicant address list acquiring module 1230 acquires an address list of an applicant, instead of an address list of an administrator.

The administrator search module 1235 searches a second storing device (the user information storage device 220, the user terminal 210 which is used by an applicant, or the like) which stores information of a person who is able to communicate with an applicant for information of an administrator of the image processing device 1200. Although the administrator search module 1235 performs processing similar to that of the applicant search module 135, the administrator search module 1235 searches for an administrator, instead of an applicant.

In the case where information of the administrator of the image processing device 1200 is stored in the second storing device, which stores information of a person who is able to communicate with the applicant (based on a result of processing by the administrator search module 1235), the use permission processing module 140 transmits to the information processing device 200 information indicating that a permission for use is granted to the applicant. Obviously, in the case where information of the administrator is not stored in the second storing device, the use permission processing module 140 performs error processing (presentation of an error message to the applicant, etc.) or the like, without transmitting to the information processing device 200 information indicating that a permission for use is granted to the applicant.

Instead of the administrator address list acquiring module 130 and the applicant search module 135, the applicant address list acquiring module 1230 and the administrator search module 1235 may perform processing. In accordance with processing by the administrator address list acquiring module 130, the applicant search module 135, the applicant address list acquiring module 1230, and the administrator search module 1235, in the case where an applicant and an administrator are found by the applicant search module 135 and the administrator search module 1235, information indicating that a permission for use is granted to the applicant may be transmitted to the information processing device 200.

Figure 13:
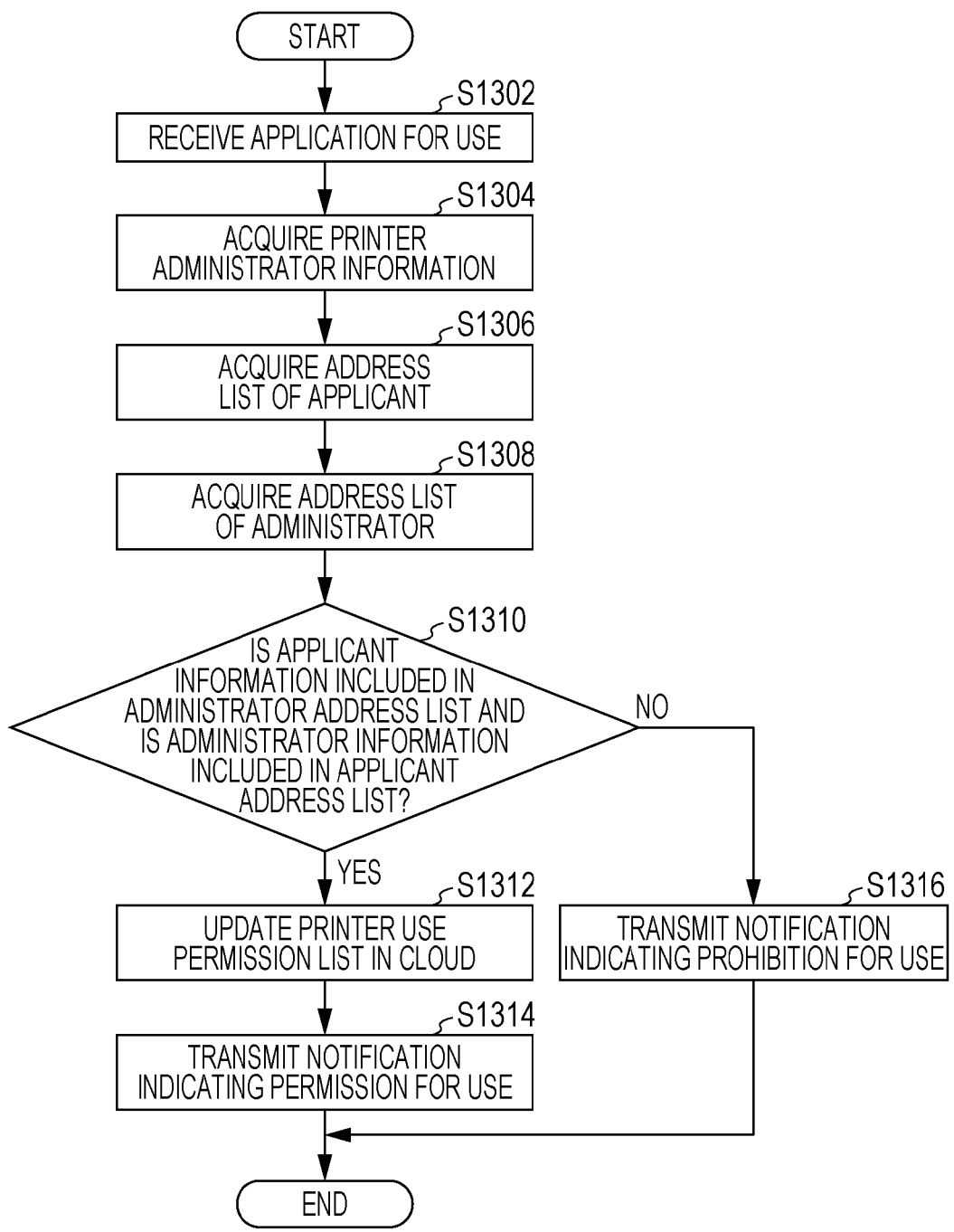
FIG. 13 is a flowchart illustrating an example of a process according to the third exemplary embodiment.

FIG. 13 is a flowchart illustrating an example of a process according to the third exemplary embodiment. The flowchart illustrated in FIG. 13 is different from the flowchart illustrated in FIG. 3 (the flowchart which illustrates an example of a process according to the first exemplary embodiment) in that step S1306 is added and step S1310 is different from step S308).

In step S1302, an application for use is received.

In step S1304, printer administrator information is acquired.

In step S1306, the applicant address list acquiring module 1230 acquires an address list of an applicant.

In step S1308, an address list of an administrator is acquired.

In step S1310, the applicant search module 135 determines whether or not applicant information is included in the administrator address list, and the administrator search module 1235 determines whether or not administrator information is included in the applicant address list. In the case where the applicant information and the administrator information are included in the corresponding address lists, the process proceeds to step S1312. In other cases, the process proceeds to step S1316.

In step S1312, a printer use permission list is updated in a cloud.

In step S1314, a notification indicating a permission for use is transmitted.

In step S1316, a notification indicating a prohibition for use is transmitted.

Figure 14:
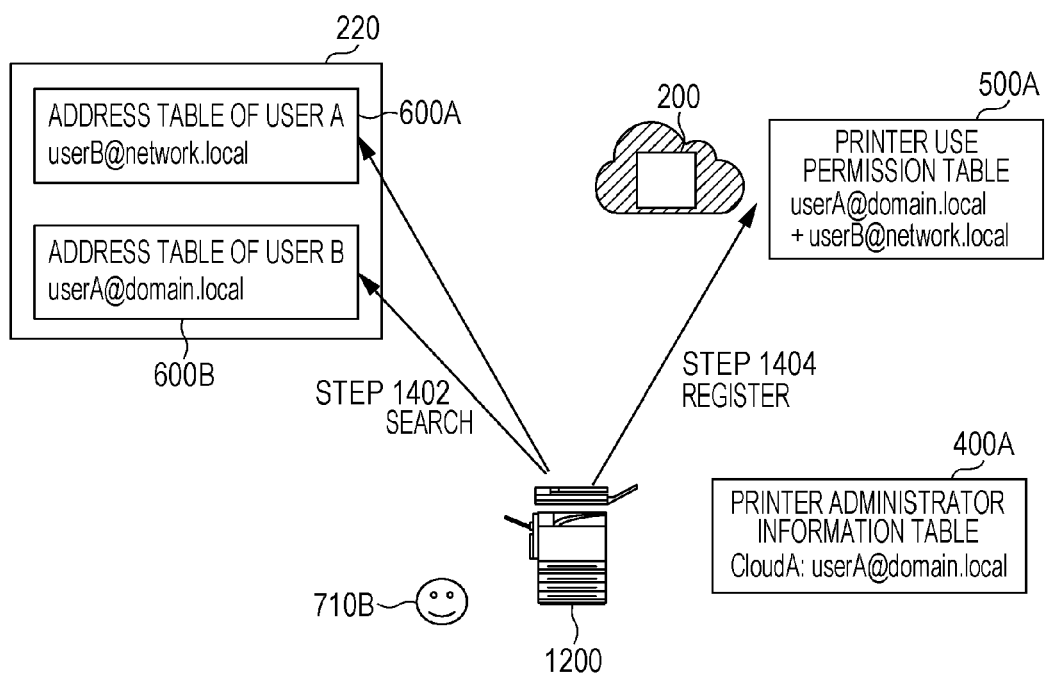
FIG. 14 illustrates an example of a process according to the third exemplary embodiment.

FIG. 14 illustrates an example of a process according to the third exemplary embodiment.

The image processing device 1200 stores the printer administrator information table 400A. In the printer administrator information table 400A, "CloudA: userA@domain.local" is registered. That is, the administrator of the image processing device 1200 is a user A and is registered as an administrator in the CloudA (cloud printing).

The user information storage device 220 stores the address table 600A of the user A and the address table 600B of the user B. In the address table 600A of the user A, "userB@network.local" is registered. In the address table 600B of the user B, "userA@domain.local" is registered.

Furthermore, the information processing device 200 stores the printer use permission table 500A. At this stage, only "userA@domain.local" is registered in the printer use permission table 500A.

The user B 710B operates the image processing device 1200 to log into the information processing device 200 and applies for use. When an application for use is made, the image processing device 1200 searches the address table 600B of the user B and the address table 600A of the user A, who is the administrator of the printer (STEP 1402). In the case where the addresses exist, the image processing device 1200 performs registration to the information processing device 200 (STEP 1404). The information processing device 200 performs setting for the printer use permission table 500A such that a permission to use the image processing device 1200 is granted to the user B. After this processing, "userA@domain.local" and "userB@network.local" are registered in the printer use permission table 500A of the information processing device 200, as illustrated in the example of FIG. 14. After the permission for use is granted at the information processing device 200, the image processing device 1200 presents a notification of permission to the user B 710B.

The image processing device 1200 may communicate with the information processing device 200 (or the user information storage device 220) by using a browser for a display such as a liquid crystal display. Thus, in such a case, the user B 710B makes an application for permission by an operation using the browser of the image processing device 1200.

Fourth Exemplary Embodiment

Figure 15:
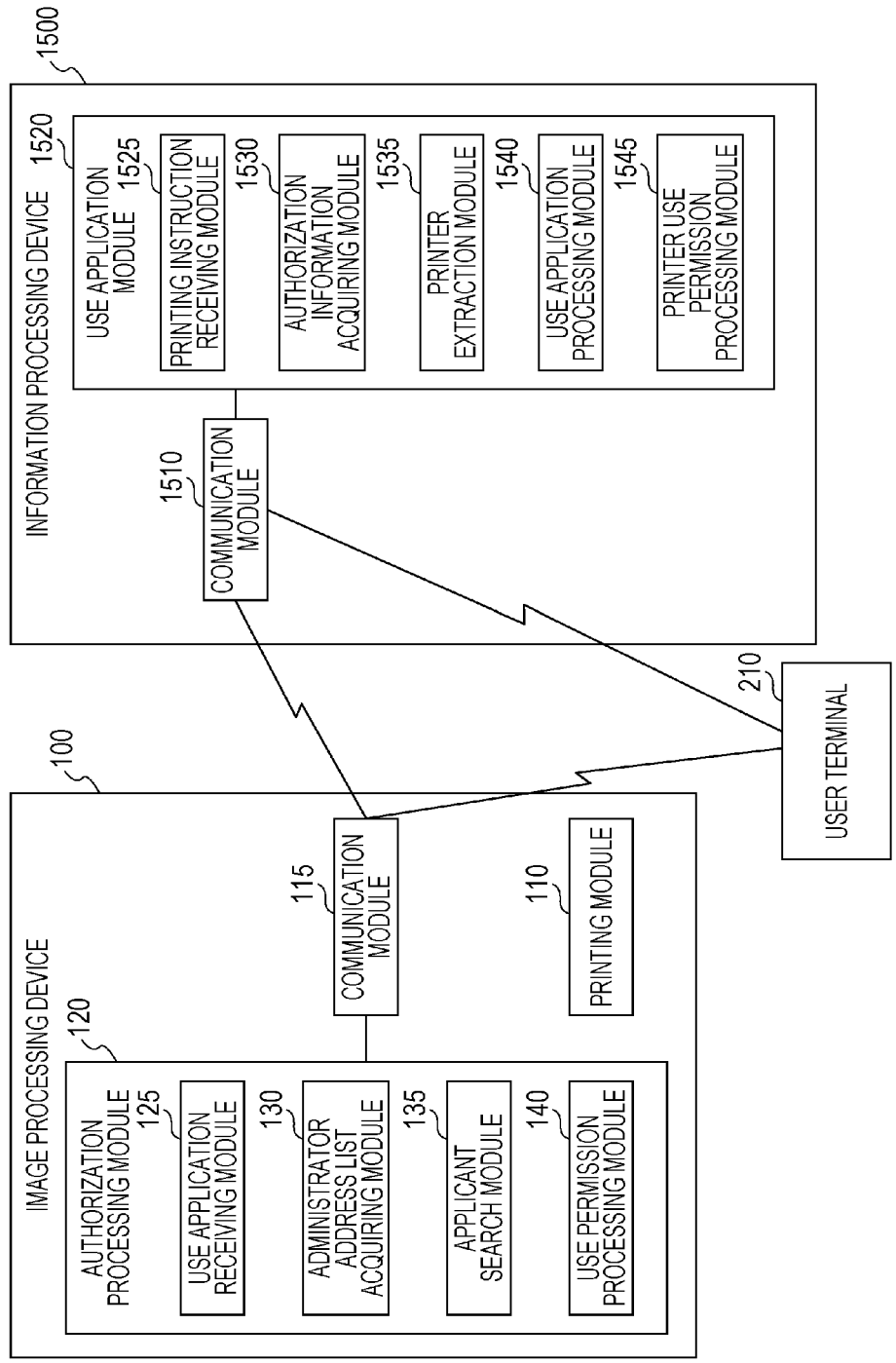
FIG. 15 is a conceptual module configuration diagram illustrating an example of a configuration according to a fourth exemplary embodiment.

FIG. 15 is a conceptual module configuration diagram illustrating an example of a configuration according to a fourth exemplary embodiment.

The image processing device 100 includes the printing module 110, the communication module 115, and the authorization processing module 120. The communication module 115 is connected to the authorization processing module 120, and is connected to a communication module 1510 of an information processing device 1500 and the user terminal 210 via a communication line. The authorization processing module 120 includes the use application receiving module 125, the administrator address list acquiring module 130, the applicant search module 135, and the use permission processing module 140, and is connected to the communication module 115.

The user terminal 210 is connected to the communication module 115 of the image processing device 100 and the communication module 1510 of the information processing device 1500 via a communication line.

The information processing device 1500 includes the communication module 1510 and a use application module 1520.

The communication module 1510 is connected to the use application module 1520, and is connected to the communication module 115 of the image processing device 100 and the user terminal 210 via a communication line. The communication module 1510 communicates with the image processing device 100 and the user terminal 210.

The use application module 1520 includes a printing instruction receiving module 1525, an authorization information acquiring module 1530, a printer extraction module 1535, a use application processing module 1540, and a printer use permission processing module 1545, and is connected to the communication module 1510. In accordance with a document printing instruction from the user terminal 210, the use application module 1520 performs processing for granting a user who issued the instruction a permission to use the image processing device 100.

The printing instruction receiving module 1525 receives a document printing instruction from the user terminal 210 via the communication module 1510.

Figures 17, 18:
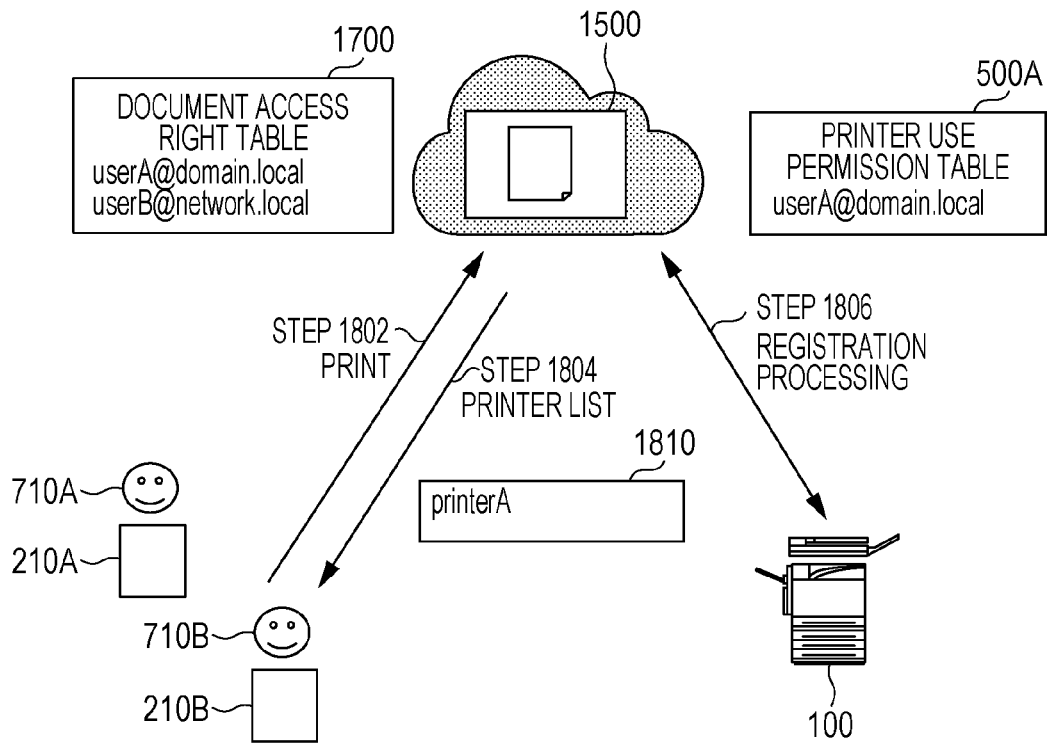
FIG. 17 is an explanatory diagram illustrating an example of a data structure of a document access right table.
FIG. 18 illustrates an example of a process according to the fourth exemplary embodiment.

The authorization information acquiring module 1530 acquires authorization information of a document as a printing target which is received by the printing instruction receiving module 1525. For example, the authorization information is obtained from a document access right table 1700. The document access right table 1700 may be added to a document or obtained from a document management device. FIG. 17 is an explanatory diagram illustrating an example of a data structure of the document access right table 1700. The document access right table 1700 includes a document ID field 1710, a user ID field 1720, and an authorization field 1730. In the fourth exemplary embodiment, the document ID field 1710 stores information (a document ID) for uniquely identifying a document. The user ID field 1720 stores a user ID of a user who has authorization for the document. Plural users may have authorization. The authorization field 1730 stores the type of authorization (reading, editing, deletion, etc.) for the document that the user have.

The printer extraction module 1535 extracts information of a user who has authorization for the document, and extracts information of the image processing device 100 with which the user is able to perform printing.

In the case where a permission to use the image processing device 100 is not granted to an applicant (a user of the user terminal 210) who issued a document printing instruction, the use application processing module 1540 extracts information of a different person B who has authorization for the document, and transmits an application by the applicant to the image processing device 100 for which a permission for use is granted to the different person B.

Then, the use application receiving module 125 of the image processing device 100 receives the application from the information processing device 1500. The image processing device 100 performs processing described in the foregoing exemplary embodiments. Thus, specifically, in the case where the user B who issued the printing instruction is not granted a permission to use the image processing device 100 but the user A who has authorization for the document as the printing target is granted a permission to use the image processing device 100, printing with the image processing device 100 is permitted even for the printing instruction from the user B.

The printer use permission processing module 1545 performs processing regarding the printer use permission table 500.

Figure 16:
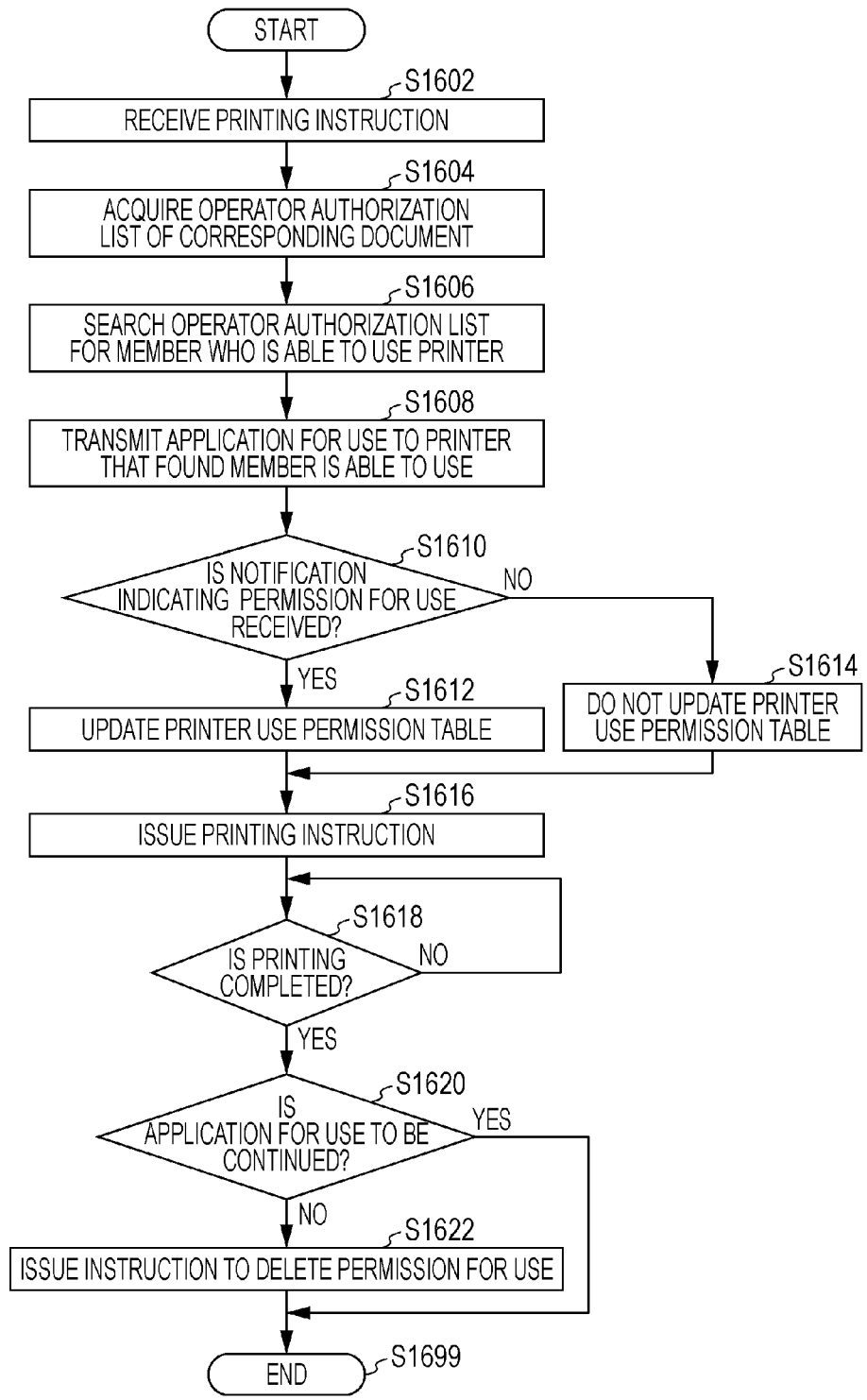
FIG. 16 is a flowchart illustrating an example of a process according to the fourth exemplary embodiment.

FIG. 16 is a flowchart illustrating an example of a process according to the fourth exemplary embodiment.

In step S1602, the printing instruction receiving module 1525 receives a printing instruction.

In step S1604, the authorization information acquiring module 1530 acquires an operator authorization list of a corresponding document.

In step S1606, the printer extraction module 1535 searches the operator authorization list for a member who is able to use a printer.

In step S1608, the use application processing module 1540 transmits an application for use to the printer that the found member is able to use.

In step S1610, the use application processing module 1540 determines whether or not a notification indicating a permission for use is received. In the case where the notification indicating the permission for use is received, the process proceeds to step S1612. In the case where the notification indicating the permission for use is not received, the process proceeds to step S1614.

In step S1612, the printer use permission processing module 1545 updates the printer use permission table 500.

In step S1614, the printer use permission processing module 1545 does not update the printer use permission table 500.

In step S1616, the information processing device 1500 instructs the image processing device 100 to perform printing.

In step S1618, the printer use permission processing module 1545 determines whether or not printing is completed. In the case where printing is completed, the process proceeds to step S1620. In the case where printing is not completed, the process waits until printing is completed.

In step S1620, the printer use permission processing module 1545 determines whether or not an application for use is to continue to be made. In the case where an application for use is to continue to be made, the process ends (step S1699). In the case where an application for use is not to continue to be made, the process proceeds to step S1622.

In step S1622, the printer use permission processing module 1545 issues an instruction to delete the permission for use.

By the processing of step S1608, the process described in the flowchart illustrated in FIG. 3 is performed by the image processing device 100. Reception of the application for use in step S302 corresponds to reception of the application for use which is transmitted in step S1608.

FIG. 18 illustrates an example of a process according to the fourth exemplary embodiment.

It is assumed that the user A 710A is granted a permission for printing using the image processing device 100, whereas the user B 710B is not granted a permission for printing using the image processing device 100. The user B 710B creates a document together with the user A 710A. The document is stored, for example, in the information processing device 1500. The user A 710A and the user B 710B are both granted a right to operate the document. Furthermore, "userA@domain.local" is registered in the printer use permission table 500A, and "userA@domain.local, userB@network.local" is registered in the document access right table 1700.

When the user B 710B issues an instruction to print the document stored in the information processing device 1500 (STEP 1802), the operations explained below are performed prior to selection of a printer.

The information processing device 1500 refers to an operation right for the document (the document access right table 1700) and a permission for use of a printer (the printer use permission table 500A) which is granted to users who have the operation right (the user A 710A and the user B 710B). In the case where a user who has the operation right for the document (in this case, the user A 710A) is granted the permission for printing using the image processing device 100, the permission to use the image processing device 100 is automatically granted to the user who is not currently granted (in this case, the user B 710B), and the newly granted user is displayed as a candidate in a list for printer selection (STEP 1804). In this case, "printer A (image processing device 100)" in a printer list 1810 is displayed.

After that, in STEP 1806, processing for registering the user B 710B to the printer use permission table 500A is performed (steps S1610 to S1622 in the flowchart illustrated in the example of FIG. 16).

The information processing device 1500 may include, as authorization for a document, a sender and a recipient of the document, sharing of schedule of the document, a reference right, and the like. Thus, the image processing device 100 of which users including an operator, a sender, a recipient, and a person who shares the document are granted a permission for use may be selected in the case where a printing instruction for the corresponding document is issued.

Furthermore, the image processing device 100 itself may be registered as an administrator of the image processing device 100 to the information processing device 200 (the information processing device 1500). A user name and authentication information as the administrator of the image processing device 100 are automatically generated. It is confirmed whether the image processing device 100 has already been registered as an administrator of a different image processing device 100. In the case where the image processing device 100 itself has already been registered as an administrator of a different image processing device 100, information of an address list of the registered image processing device 100 (a storing device which stores information of a person who is able to communicate with an administrator) is acquired. In the case where the image processing device 100 itself has not been registered as an administrator of a different image processing device 100 (that is, in the case where it is the first time for the image processing device 100 to be registered as an administrator of any image processing device 100), setting is performed in accordance with additional conditions of an address list of the image processing device 100. The additional conditions include, for example, using an address list of a predetermined user, using an address list of a user in a predetermined domain, and the like.

Fifth Exemplary Embodiment

Figure 19:
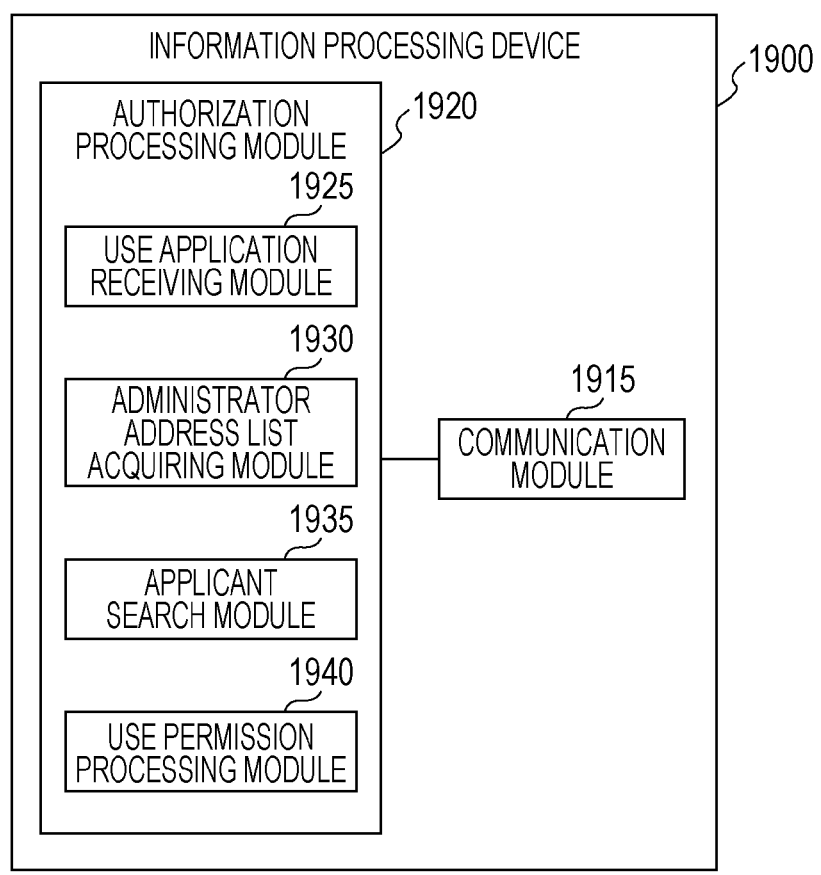
FIG. 19 is a conceptual module configuration diagram illustrating an example of a configuration according to a fifth exemplary embodiment.

FIG. 19 is a conceptual module configuration diagram illustrating an example of a configuration according to a fifth exemplary embodiment.

An information processing device 1900 according to the fifth exemplary embodiment registers a person who is able to use an image processing device (a user of cloud printing), and includes a communication module 1915 and an authorization processing module 1920, as illustrated in the example of FIG. 19. The information processing device 1900 includes a function as an information processing device which includes a function of cloud printing according to the foregoing exemplary embodiments.

As with the image processing device 100 according to the first exemplary embodiment, the information processing device 1900 receives an application for use and determines the relationship between an applicant and an administrator. However, the determination subject is a cloud server. An application for use received at this time may be an application for use which is directly transmitted to the information processing device 1900 by an applicant or transmitted to the information processing device 1900 by the image processing device 100 when the image processing device 100 receives the application for use from the applicant.

The communication module 1915 is connected to the authorization processing module 1920. The communication module 1915 performs communication with a terminal which is used by an applicant or the like (the user terminal 210 which is described above with reference to the example of FIG. 2 or the like), an information processing device which includes a function of cloud printing, and the like.

The authorization processing module 1920 includes a use application receiving module 1925, an administrator address list acquiring module 1930, an applicant search module 1935, and a use permission processing module 1940, and is connected to the communication module 1915. The authorization processing module 1920 grants an applicant a permission for cloud printing using an image processing device.

The use application receiving module 1925 receives, via the communication module 1915, an application for a permission for cloud printing using an image processing device from a terminal that an applicant uses.

The administrator address list acquiring module 1930 extracts an administrator of the image processing device, and acquires, for example, an address list of the administrator. Information of the administrator is stored in the information processing device 1900. The information of the administrator may be extracted, for example, from the printer administrator information table 400 which is stored in the information processing device 1900.

The applicant search module 1935 searches a storing device (the user information storage device 220 which is described above with reference to the example of FIG. 2, the user terminal 210 which is used by an administrator, or the like) which stores information of a person who is associated with an administrator of the image processing device (for example, a person who is able to communicate with an administrator) for information of an applicant who applies for use of the image processing device. In the case where information of the applicant is stored in the storing device (in the case where an applicant is found by the search), there is a high possibility that the administrator and the applicant are able to communicate with each other and they know each other. Therefore, a permission to use the image processing device may be granted to the applicant. The storing device which stores information of a person who is able to communicate with an administrator may be, for example, an electronic mail address book, a friend list in an SNS, an electronic address book (user information) of the administrator, or the like. Furthermore, a determination as to whether or not a domain range, an email domain, or the like of a user ID (including a user address or the like) is the same between the administrator and the applicant may also be performed. For example, in the user information storage device 220 or the user terminal 210 which is used by the administrator, the address table 600 (of the administrator) is stored for each user.

In the case where information of the applicant who applies for use of the image processing device is stored in the storing device which stores information of a person who is able to communicate with the administrator of the image processing device (based on a result of processing by the applicant search module 1935), the use permission processing module 1940 grants the applicant a permission for use. Obviously, in the case where information of the applicant is not stored in the storing device, the use permission processing module 1940 performs error processing (presentation of an error message to the applicant, etc.) or the like, without granting the applicant the permission for use.

Then, the use permission processing module 1940 associates the image processing device with the applicant. For example, the use permission processing module 1940 performs management using the printer use permission table 500.

After performing registration, the use permission processing module 1940 presents a notification indicating the permission for use to the applicant. The presentation includes transmission of an electronic mail or the like. For example, in the case where the applicant for use is directly transmitted from the applicant to the information processing device 1900, the notification indicating the permission for use may be transmitted to identification information (an IP address etc.), which is included in the application for use, to access the user terminal 210 of the applicant or an electronic mail address of a user. In the case where the application for use is transmitted from the image processing device 100, information indicating that the permission for use is to be presented to the applicant may be transmitted to the image processing device 100 and the image processing device 100 may present a notification indicating the permission for use to the applicant.

Furthermore, in the case where an applicant is deleted as a person who is able to communicate with an administrator from the storing device, the use permission processing module 1940 may cancel the permission for use which was granted to the applicant. That is, in the case where after a permission for use is granted to an applicant, information stored in the storing device is changed and the applicant is deleted, the permission for use which was granted to the applicant is also deleted. The above processing may be performed at predetermined intervals or may be performed when a notification indicating occurrence of a change is received from the storing device.

Figure 20:
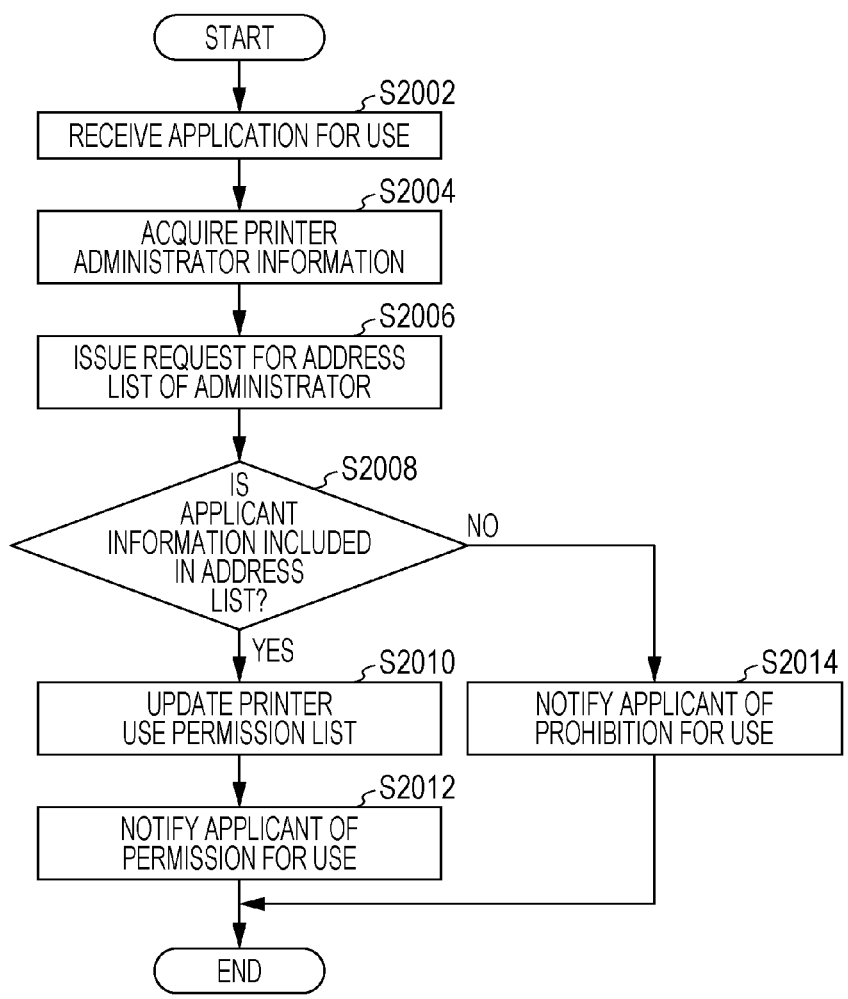
FIG. 20 is a flowchart illustrating an example of a process according to the fifth exemplary embodiment.

FIG. 20 is a flowchart illustrating an example of a process according to the fifth exemplary embodiment.

In step S2002, the use application receiving module 1925 receives an application for use of the image processing device from the user terminal 210 of an applicant.

In step S2004, the administrator address list acquiring module 1930 acquires printer administrator information. As described above, for example, the printer administrator information may be obtained from the printer administrator information table 400.

In step S2006, the administrator address list acquiring module 1930 issues a request for an address list of an administrator. As described above, for example, the address list of the administrator may be obtained from the address table 600 of the administrator which is stored in the user information storage device 220.

In step S2008, the applicant search module 1935 determines whether or not applicant information is included in the address list. In the case where the applicant information is included in the address list, the process proceeds to step S2010. In the case where the applicant information is not included in the address list, the process proceeds to step S2014.

In step S2010, the use permission processing module 1940 updates a printer use permission list.

In step S2012, the use permission processing module 1940 transmits a notification indicating a permission for use to the applicant.

In step S2014, the use permission processing module 1940 transmits a notification indicating a prohibition for use to the applicant.

An example of a hardware configuration of an image processing device and an information processing device according to an exemplary embodiment will be described below with reference to FIG. 21. The configuration illustrated in FIG. 21 includes, for example, a PC or the like. An example of the hardware configuration including a data reading unit 2117 such as a scanner and a data output unit 2118 such as a printer is illustrated in FIG. 21.

A CPU 2101 is a controller which performs processing in accordance with a computer program which describes an execution sequence of the various modules that are described above in the foregoing exemplary embodiments, that is, modules including the authorization processing module 120, the use application receiving module 125, the administrator address list acquiring module 130, the applicant search module 135, the use permission processing module 140, the use application module 820, the use application receiving module 825, the use application processing module 830, the applicant address list acquiring module 1230, the administrator search module 1235, the use application module 1520, the printing instruction receiving module 1525, the authorization information acquiring module 1530, the printer extraction module 1535, the use application processing module 1540, and the printer use permission processing module 1545.

A read only memory (ROM) 2102 stores programs, arithmetic parameters, and the like to be used by the CPU 2101. A RAM 2103 stores programs to be used by execution at the CPU 2101, parameters which vary in an appropriate manner by the execution, and the like. The CPU 2101, the ROM 2102, and the RAM 2103 are connected to one another via a host bus 2104 which includes a CPU bus or the like.

The host bus 2104 is connected to an external bus 2106 such as a peripheral component interconnect/interface (PCI) bus via a bridge 2105.

A keyboard 2108 and a pointing device 2109 such as a mouse are devices to be operated by an operator. A display 2110 may be, for example, a liquid crystal display or a cathode ray tube (CRT), and displays various types of information as text and image information. Furthermore, the display 2110 may be a touch screen or the like which includes both functions of the pointing device 2109 and the display 2110.

A hard disk drive (HDD) 2111 stores therein a hard disk (may be a flash memory or the like), drives the hard disk, and records or reproduces a program and information to be executed by the CPU 2101. In the hard disk, the printer administrator information table 400, the printer use permission table 500, the address table 600, the printer administrator information table 1000, the document access right table 1700, and the like are stored. Furthermore, other various data, various computer programs, and the like are stored in the hard disk.

A drive 2112 reads data or a program which is stored in a loaded removable recoding medium 2113 such as a magnetic disk, an optical disc, a magneto-optical disc, or a semiconductor memory, and supplies the data or the program to the RAM 2103 which is connected via the interface 2107, the external bus 2106, the bridge 2105, and the host bus 2104. The removable recording medium 2113 may also be used as a data recording region.

A connection port 2114 is a port which allows connection with an external connection device 2115, and includes a connection part for a USB, IEEE 1394, and the like. The connection port 2114 is connected to the CPU 2101 and the like via the interface 2107 and the external bus 2106, the bridge 2105, the host bus 2104, and the like. A communication unit 2116 is connected to a communication line, and performs processing for data communication with the outside. The data reading unit 2117 is, for example, a scanner, and performs document reading processing. The data output unit 2118 is, for example, a printer, and performs document data output processing.

The hardware configuration of the image processing device and the information processing device illustrated in FIG. 21 illustrates a configuration example. An exemplary embodiment is not limited to the configuration illustrated in FIG. 21 as long as a configuration which may execute modules explained in the exemplary embodiment is provided. For example, part of the modules may be configured as dedicated hardware (for example, an application specific integrated circuit (ASIC) or the like), part of the modules may be arranged in an external system in such a manner that they are connected via a communication line, or the system illustrated in FIG. 21 which is provided in plural may be connected via a communication line in such a manner that they operate in cooperation. Furthermore, in particular, part of the modules may be incorporated in a personal computer, a portable information communication device (including a mobile phone, a smartphone, a mobile device, and a wearable computer), an information electronic appliance, a robot, a copying machine, a facsimile machine, a scanner, a printer, or a multifunction device (an image processing device including two or more functions of a scanner, a printer, a copying machine, a facsimile machine, and the like).

The foregoing various exemplary embodiments may be combined together (for example, including adding a module in an exemplary embodiment to a different exemplary embodiment and replacing a module in an exemplary embodiment with a module in a different exemplary embodiment), and a technique described in the related art may be adopted as processing details of individual modules.

The programs described above may be stored in a recording medium and provided or may be supplied through communication. In this case, for example, the program described above may be considered as an invention of "a computer-readable recording medium storing a program".

"A computer-readable recording medium storing a program" represents a computer-readable recording medium which stores a program to be used for installation, execution, and distribution of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-Ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The entire or part of the above-mentioned program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be the entire or part of another program or may be recorded in a recording medium along with a separate program. Furthermore, the program may be divided into multiple recording media and recorded. The program may be recorded in any format, such as compression or encryption, as long as the program may be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a processor programmed to:
receive an application for use of the image processing device from an applicant;
determine whether or not the applicant is associated with an administrator of the image processing device;
in response to determining that the applicant is associated with the administrator of the image processing device, transmit a registration request to an external device so that the applicant is permitted to use the image processing device;
in response to determining that the applicant is not associated with the administrator of the image processing device, determine whether the applicant is associated with a second applicant that is associated with the administrator, and upon determining that the applicant is associated with the second applicant, transmit the registration request to the external device so that the applicant is permitted to use the image processing device based on association with the second applicant associated with the administrator of the image processing device; and
after a notification indicating registration is received from the external device, present information indicating the permission for use to the applicant.

2. The image processing device according to claim 1, wherein in response to determining that the applicant has come to be unassociated with the administrator, transmit information indicating cancellation of the permission for use granted to the applicant to the external device.

3. The image processing device according to claim 2, wherein in response to determining that the administrator is associated with the applicant, transmit a registration request to the external device so that the applicant is permitted to use the image processing device.

4. The image processing device according to claim 1, wherein in response to determining that the administrator is associated with the applicant, transmit a registration request to the external device so that the applicant is permitted to use the image processing device.

5. An information processing device comprising:
a processor programmed to:
receive an application for use for allowing an applicant to use an image processing device;
determine whether or not the applicant is associated with an administrator of the image processing device;
in response to determining that the applicant is associated with the administrator, register information indicating that the applicant is permitted to use the image processing device;
in response to determining that the applicant is not associated with the administrator of the image processing device, determine whether the applicant is associated with a second applicant that is associated with the administrator, and upon determining that the applicant is associated with the second applicant, register information indicating that the applicant is permitted to use the image processing device based on association with the second applicant associated with the administrator of the image processing device; and
after the registration, notify the applicant or the image processing device of information indicating the permission for use granted to the applicant.

6. An image processing method comprising:
receiving an application for use of an image processing device from an applicant;
determining whether or not the applicant is associated with an administrator of the image processing device;
in response to determining that the applicant is associated with the administrator of the image processing device, transmitting a registration request to an external device so that the applicant is permitted to use the image processing device;

in response to determining that the applicant is not associated with the administrator of the image processing device, determining whether the applicant is associated with a second applicant that is associated with the administrator, and upon determining that the applicant is associated with the second applicant, transmitting the registration request to the external device so that the applicant is permitted to use the image processing device based on association with the second applicant associated with the administrator of the image processing device; and presenting, after a notification indicating registration is received from the external device, information indicating the permission for use to the applicant.

7. A non-transitory computer readable medium storing a program causing a computer to execute a process for image processing, the process comprising:

receiving an application for use of an image processing device from an applicant;

determining whether or not the applicant is associated with an administrator of the image processing device;

in response to determining that the applicant is associated with the administrator of the image processing device, transmitting a registration request to an external device so that the applicant is permitted to use the image processing device;

in response to determining that the applicant is not associated with the administrator of the image processing device, determining whether the applicant is associated with a second applicant that is associated with the administrator, and upon determining that the applicant is associated with the second applicant, transmitting the registration request to the external device so that the applicant is permitted to use the image processing device based on association with the second applicant associated with the administrator of the image processing device; and presenting, after a notification indicating registration is received from the external device, information indicating the permission for use to the applicant.

* * * * *